(12) United States Patent
Mondini (10) Patent No.: US 11,267,186 B2
(45) Date of Patent: Mar. 8, 2022

(54) APPARATUS FOR THERMOFORMING PLASTIC CONTAINERS

(71) Applicant: MONDINI S.R.L., Brescia (IT)

(72) Inventor: Giovanni Mondini, Cologne (IT)

(73) Assignee: MONDINI S.R.L., Brescia (IT)

( * ) Notice: Subject to any disclaimer, the term of this patent is extended or adjusted under 35 U.S.C. 154(b) by 285 days.

(21) Appl. No.: 16/503,014

(22) Filed: Jul. 3, 2019

(65) Prior Publication Data

US 2020/0009781 A1 Jan. 9, 2020

(30) Foreign Application Priority Data

Jul. 6, 2018 (IT) .................. 102018000006991

(51) Int. Cl.
| | | |
|---|---|---|
| *B29C 51/18* | (2006.01) | |
| *B29C 51/38* | (2006.01) | |
| *B29C 51/44* | (2006.01) | |
| *B29C 51/30* | (2006.01) | |
| *B29L 31/00* | (2006.01) | |
| *B29C 51/10* | (2006.01) | |

(52) U.S. Cl.
CPC ............. *B29C 51/18* (2013.01); *B29C 51/10* (2013.01); *B29C 51/306* (2013.01); *B29C 51/38* (2013.01); *B29C 51/44* (2013.01); *B29L 2031/712* (2013.01)

(58) Field of Classification Search
CPC ...................................................... B29C 51/44
See application file for complete search history.

(56) References Cited

U.S. PATENT DOCUMENTS

| 3,650,655 | A | | 3/1972 | Santouris | |
|---|---|---|---|---|---|
| 5,453,237 | A | | 9/1995 | Padovani | |
| 5,591,463 | A | | 7/1997 | Padovani | |
| 5,650,110 | A | | 7/1997 | Padovani | |
| 5,879,724 | A | * | 3/1999 | Sakamoto | ............... B29C 51/44 425/385 |

FOREIGN PATENT DOCUMENTS

| BE | 1005832 A5 | 2/1994 |
|---|---|---|
| DE | 9108344 U1 | 8/1991 |
| DE | 102013007954 A1 | 11/2014 |
| WO | 2011151374 A1 | 12/2011 |

* cited by examiner

*Primary Examiner* — Niki Bakhtiari
*Assistant Examiner* — John J DeRusso
(74) *Attorney, Agent, or Firm* — Pearne & Gordon LLP (57) ABSTRACT

An apparatus for thermoforming plastic containers (2) comprising at least one thermoforming device (3) suitable for thermoforming a flat sheet (4) for making a container (2) equipped with an upper flange (5) projecting outward and at least one extracting device (6) associable with the thermoforming device (3) for extracting the thermoformed container (2) from it; when the extracting device (6) is associated with the thermoforming device (3) for extracting the already thermoformed container (2), the extracting device (6) and the thermoforming device (3) define a perimetric mould (7) suitable for hot bending the annular flange (5) of the already thermoformed container (2) before it is extracted from the thermoforming device (3).

24 Claims, 5 Drawing Sheets

APPARATUS FOR THERMOFORMING PLASTIC CONTAINERS

The present invention relates to an apparatus for thermoforming plastic containers.

In the food packaging sector in particular, the use of basin or tray-shaped plastic containers obtained via a thermoforming process (generally vacuum-type) and top-closed with a plastic film has been known for many years.

In general, plastic containers of this type have a bottom wall and a side wall extending upwards from the bottom wall. An annular band then extends outward from the top of the side wall, which forms an outline for the upper opening of the container and to which the container-closing plastic film is welded.

Currently, plastic containers of this type can be divided into two categories according to the structure of the annular band.

In this respect, a first category of plastic containers have a flat annular band extending horizontally only.

Alternatively, a second category of plastic containers have an annular band, which is formed by a shaped flange and which has on its top surface at least two annular portions that are concentric and not coplanar to each other.

With regard to plastic containers falling under the first category, the presence of a flat flange constitutes a mechanically weak element which makes them unsuitable for any use that requires a certain robustness.

On the other hand, thanks to the presence of a shaped flange and with all other features unchanged, plastic containers falling under the second category are able to guarantee a considerably higher mechanical strength than a plastic container that has a flat flange.

In many contexts, such as in companies with small productions of a plurality of different products, it is then possible to have different packaging lines available, each intended for the packaging of products in different container categories, albeit with only one line for thermoforming containers. In these cases, however, the choice of plastic container type produced by the thermoforming line also becomes the mandatory choice for all subsequent packaging lines, even if this is not necessarily the best choice. Indeed, in many cases, it would be entirely preferable to have both container categories available. However, this is prevented by the costs associated with purchasing and installing a dual thermoforming line.

Referring still to the production of containers with a shaped flange, a further drawback of known thermoforming machines is the construction complexity associated with forming the flange. Indeed, in vacuum thermoforming, the thermoforming mould comprises a first part shaped to match the container to be obtained, and in which the vacuum is created, and a second closing part intended to be pushed against the first part so as to clamp between them the sheet of thermoformable material. The second part is generally provided with heating elements suitable for bringing the sheet of material to be thermoformed up to the thermoforming temperature. Moreover, the second part of the mould is also generally provided with a suction system so as to retain the sheet before forming.

Whereas for flat-flange applications the second part of the mould can be composed of a flat plate, when intending to make containers with a shaped flange the second part must be appropriately structured.

However, the permanent shaping of the second part makes the machine much more complex than one where the second part is a simple flat plate, firstly because the shaping makes it difficult, if not impossible, to retain the sheet on the second part itself by suction, and secondly because it necessitates the replacement of the second part, as well as the first part and any active parts of extraction devices of the thermoformed containers, whenever the format of the container to be made is to be changed. Not only does this lead to an extension in the necessary format changing times (also as the second part is provided with active heating elements which require the corresponding electrical connections to be made each time), but it also leads to an increase in production costs due to the need to have a different closing element for each category of container to be made.

In looking to overcome this drawback, embodiments have also been proposed wherein the second part of the mould comprises various parts that are movable relative to each other to enable switching between a configuration that has a flat plate and a configuration that has a shaped plate. One example of this type of apparatus is described in the document WO 2011/151374.

However, even this embodiment is not free from drawbacks.

In particular, it entails considerable construction complexity as regards the second part of the mould, especially as in many applications said second part is mounted on rotating parts of the apparatus.

In this context, the technical purpose of the present invention is to produce an apparatus for thermoforming plastic containers that offers a solution to the issues mentioned above.

In particular, the technical purpose of the present invention is to make an apparatus for thermoforming plastic containers that has a shaped flange which is simpler in construction terms than those known.

A further technical purpose of the present invention is to make an apparatus for thermoforming plastic containers in which format changes can be made quickly and easily.

Yet another technical purpose of the present invention is to make an apparatus for thermoforming plastic containers which, depending on requirements, can be used to make plastic containers either with a smooth flange or a shaped flange.

The technical purpose and the aims indicated above are substantially achieved by an apparatus for thermoforming plastic containers in accordance with the contents of the claims enclosed.

Further features and the advantages of the present invention will become more apparent after a careful reading of the detailed description of several preferred, non-limiting embodiments of an apparatus for thermoforming plastic containers, as shown in the accompanying drawings, in which.

Referring to the figures mentioned above, the reference number 1 has been assigned to a complete apparatus for thermoforming plastic containers 2 according to the present invention.

The accompanying drawings show two embodiments which differ only with regard to the number of containers 2 that are thermoformed in one cycle. Whereas the first embodiment (FIGS. 1-10) allows a single container 2 to be obtained, the second embodiment (FIG. 11) allows two to be obtained. However, the present invention can also be applied in other machine layouts, such as in apparatuses comprising several thermoforming devices aligned either transversely (on the plane shown in the accompanying drawings) or longitudinally (on a plane perpendicular to the sheet shown in the accompanying drawings).

Likewise, although the thermoformed plastic container 2 shown in the accompanying figures has two adjacent and relatively deep containment basins (FIG. 10), in other embodiments containers 2 can be made either to have a single containment basin or more than two basins, or to have containers 2 of different depths (smaller or lower).

Figure 7:
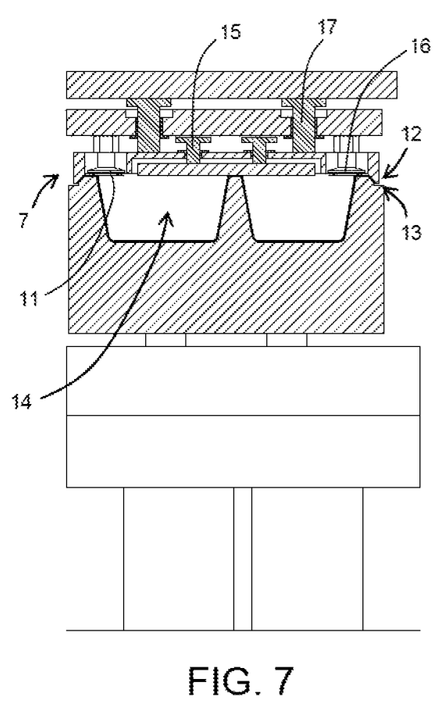

The apparatus 1 for thermoforming plastic containers 2 according to the present invention (FIG. 1) comprises, on one side, at least one thermoforming device 3 suitable for thermoforming a flat sheet 4 for making a container 2 equipped with an upper flange 5 projecting outward and, on the other side, at least one extracting device 6 associable with the thermoforming device 3 for extracting the thermoformed container 2 from it; According to the main innovative aspect of the present invention, when the extracting device 6 is associated with the thermoforming device 3 for extracting the thermoformed container 2, the extracting device 6 and the thermoforming device 3 define a perimetric mould 7 suitable for hot bending the annular flange 5 of the container 2 before it is extracted from the thermoforming device 3 (FIG. 7). Depending on requirements, the perimetric mould 7 can cover all or part of the perimeter of the entire container 2 or of one or more containment basins formed by it; in the preferred embodiment, however, the perimetric mould 7 is an annular mould that covers the entire perimetric flange 5 of the plastic container 2.

Indeed, the present invention is based on the idea of separating the step of thermoforming a plastic container 2 with a flat flange 5 from the step of shaping the flange 5. This is done by dedicating the first step to the thermoforming device 3 and the second phase to the interaction between the thermoforming device 3 and the extracting device of the container 2. Moreover, according to the present invention, the step of shaping the flange 5 is not achieved by thermoforming, but by hot bending. It should also be noted that, depending on requirements, the hot bending step may be carried out either by exploiting the residual heat of the flange 5 of the container 2 after the thermoforming process (it is sufficient for the time between the two steps to be relatively short) or by providing additional heat to the container 2 by heating the perimetric mould 7.

Figure 1:
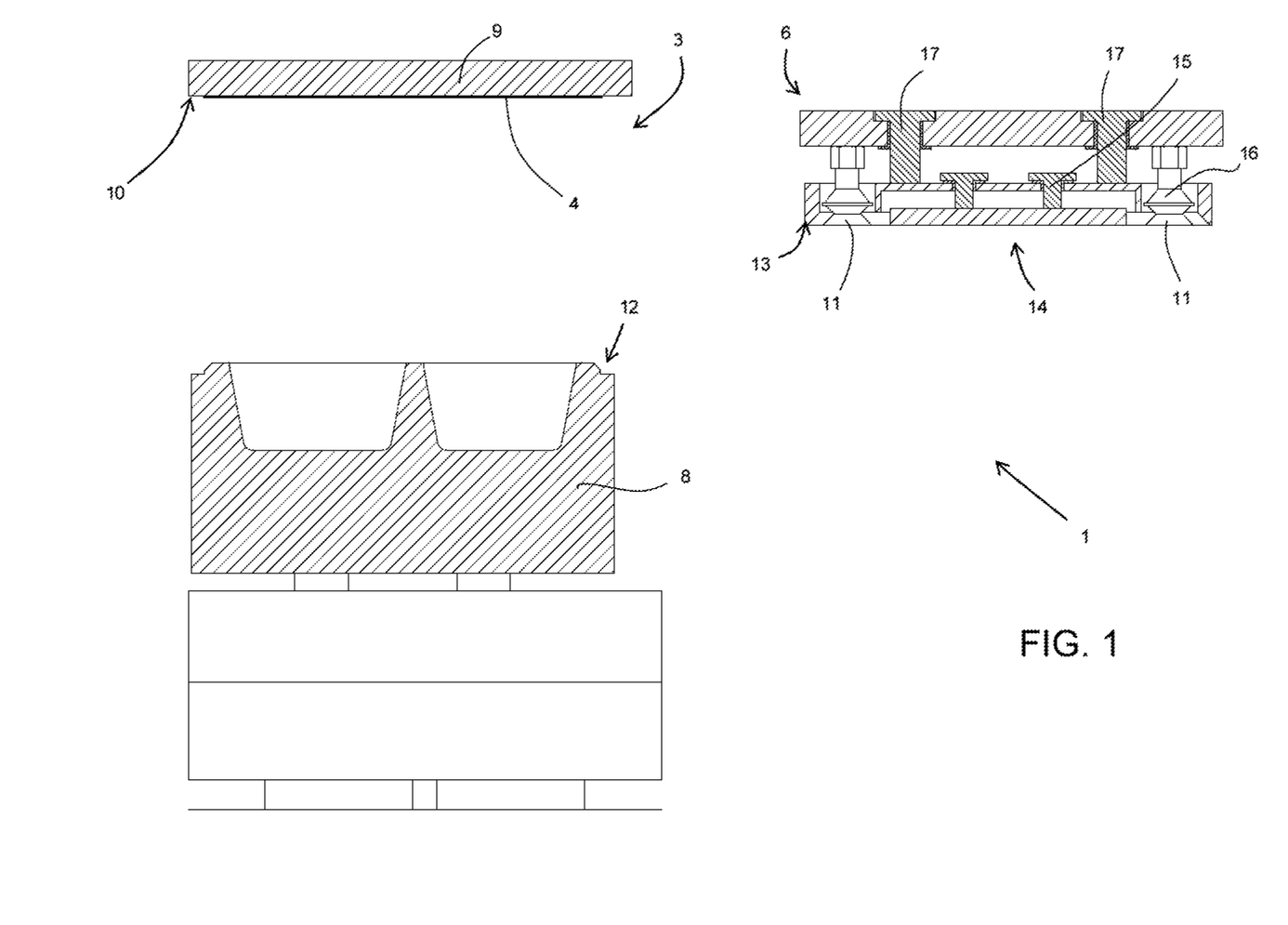
FIG. 1 shows a schematic cross-section front view of certain parts of a first embodiment of an apparatus in accordance with the present invention in an initial phase in which a sheet of flat material is retained by a closing element of a thermoforming device.
Figure 2:
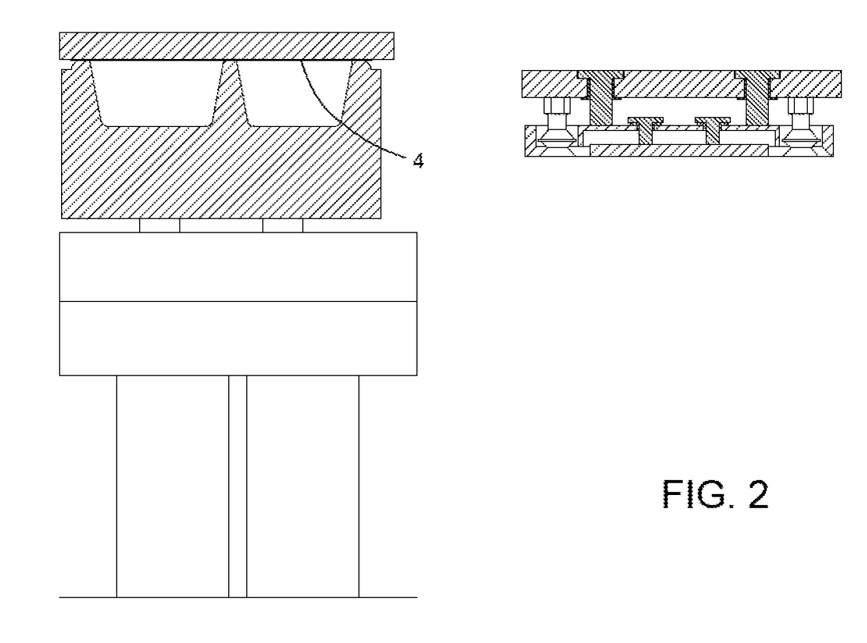
FIGS. 2 to 10 sequentially show the subsequent steps for thermoforming a plastic container, starting from the situation shown in FIG. 1.
Figure 3:
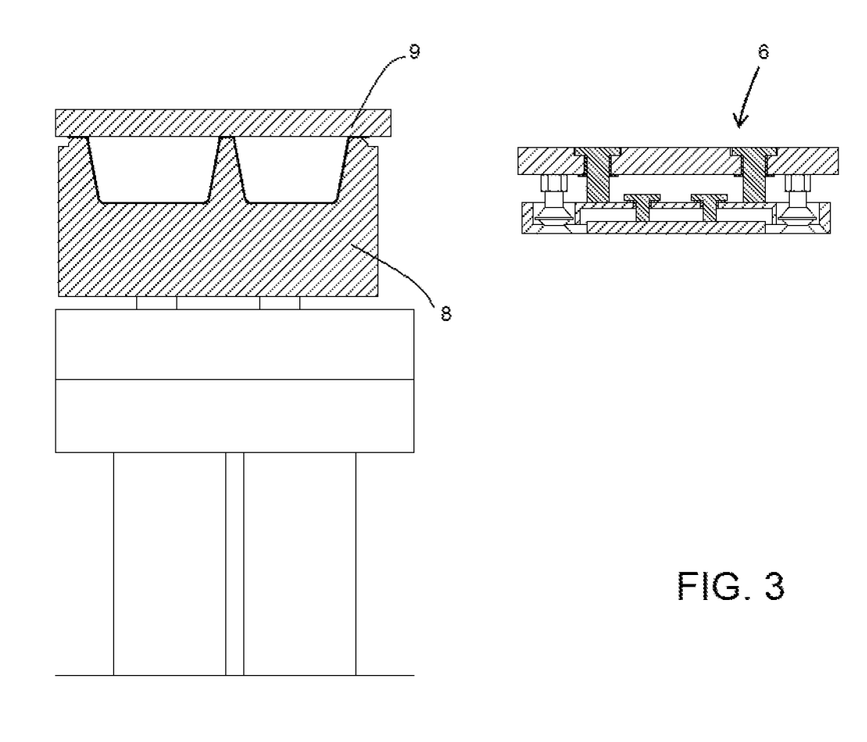

In particular, as shown in FIGS. 1 to 4, the thermoforming device 3 advantageously comprises a shaped mould 8 and a closing element 9 which are movable relative to each other between a home position in which they are at a distance from one another (FIG. 1), and a forming position in which they are near each other for, in use, clamping between them the flat sheet 4 of thermoformable plastic material (FIGS. 2 and 3). In the known way, one or more heating elements (not shown) are associated to the closing element 9 and/or the shaped mould 8 (preferably only the former).

Also preferably, the closing element 9 has a resting surface 10 which is facing the shaped mould 8 at least when they are in the forming position, and is equipped with suction means (not shown) suitable for retaining on the resting surface 10 the flat sheet 4 of thermoformable plastic material at least when the shaped mould 8 and the closing element 9 are in the home position (FIG. 1). This resting surface 10 is advantageously flat, while the suction means can independently act on different areas of the resting surface 10 so as to allow the suction action to take place only on specific areas of the same resting surface 10 (by choosing, as appropriate, the areas where the suction can be activated, a single closing element 9 can be adapted to make plastic containers 2 in several formats).

In the known way, and therefore not described in detail, suitable vacuuming means (also not shown) are then associated to the shaped mould 8 to create a sufficient depression therein for thermoforming the flat sheets.

According to the preferred embodiment of the present invention, the extracting device 6 is joinable to the shaped mould 8 and, together with the shaped mould 8, forms the perimetric mould 7.

In particular, as can be seen in FIGS. 4 to 10, the extracting device 6 is movable relative to the thermoforming device 3 between a pick-up position in which it is facing the shaped mould 8 (FIG. 5 or 6), and a releasing position (FIG. 4, 9 or 10) in which it is not facing the shaped mould 8 and allows the shifting of the shaped mould 8 and of the closing element 9 between the home position and the forming position.

In the preferred embodiment, when it is in the pick-up position the extracting device 6 is interposed between the shaped mould 8 and the closing element 9 which are placed in the home position and prevents the shifting of the shaped mould 8 and of the closing element 9 from the home position to the forming position. In other embodiments, the same result can also be achieved in a different way (for example by combining the shifting of the extracting device 6 with a shifting of the shaped mould 8).

Figure 5:
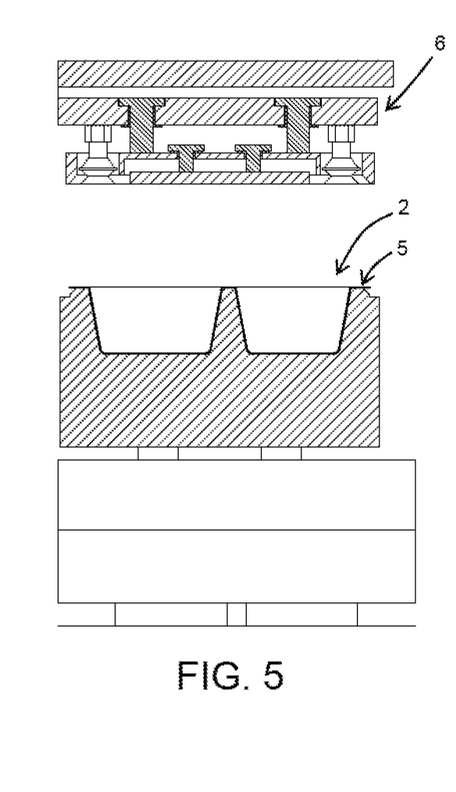
Figure 6:
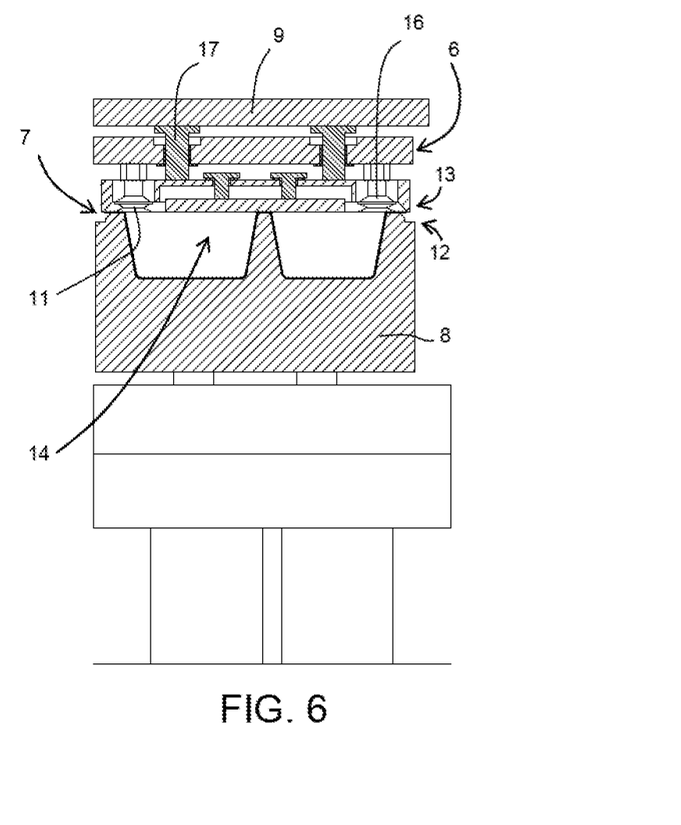

In the preferred embodiment, as can be seen in FIGS. 5 and 6, when the extracting device 6 is in the pick-up position, at least one of either the extracting device 6 or the shaped mould 8 is movable relative to the other between a stand-by position in which the two are at a distance from each other (FIG. 5) and a coupling position in which the two are near each other (FIG. 6) for, in use, allowing the container 2 to be picked up by the extracting device 6. The shifting of the extracting device 6 and/or the shaped mould 8 from the coupling position to the stand-by position, after the container 2 has been picked up by the extracting device 6, causes extraction of the container 2 from the shaped mould 8. In particular, in the preferred embodiment, the removal of the container 2 by the extracting device 6 is performed by means of a suction system associated with the extracting device 6 and, in more detail, associated with a plurality of suction elements (suction cups 11 in the accompanying drawings), which are mounted on the extracting device 6 and arranged in such a way as to interact with areas of the upper flange 5 of the thermoformed container 2 without affecting the inside of the containment basins.

In the preferred embodiment of the present invention, the perimetric mould 7 is defined by the extracting device 6 and by the shaped mould 8 when both are in the respective coupling position.

In particular, the perimetric mould 7 for hot bending the upper flange 5 of the container 2 advantageously comprises a first perimetric die 12 defined by the shaped mould 8 and a second perimetric die 13 defined by the extracting device 6.

The first perimetric die 12 and the second perimetric die 13 are shaped to match each other (in such a way as to conveniently shape the flange 5 of the container 2) and face each other when the extracting device 6 and the shaped mould 8 are in the coupling position. Furthermore, with the extracting device 6 and the shaped mould 8 still in the coupling position, at least one of either the first perimetric die 12 or the second perimetric die 13 is preferably movable relative to the other between a first position in which the first perimetric die 12 and the second perimetric die 13 are at a distance from each other and a second position in which the first perimetric die 12 and the second perimetric die 13 are near each other.

Therefore, in the preferred embodiment the activation or otherwise of the perimetric mould 7 is independent of the extraction sequence of the container 2; depending on requirements, this may or may not be activated so as to create containers 2 with a shaped flange 5 or with a flat flange 5, respectively.

In detail the extracting device 6 comprises a retaining unit 14 for retaining the container 2 associated with one or more suction elements suitable for retaining the container 2 by suction. The retaining unit 14 is also that which couples to the shaped mould 8 in the coupling position and is also movable relative to the second perimetric die 13 between a projecting position and a retracted position. When the retaining unit 14 is in the projecting position, it projects relative to the second perimetric die 13, towards the shaped mould 8, more than when it is in the retracted position. Advantageously, the shifting between the projecting and the retracted position is guided by purpose-fitted guides 15, and specific means may be present which are capable of returning the retaining unit 14 to the projecting position where there is no stress employed, such as elastic means associated with it (in the embodiment show, the force of gravity may simply be used). In order to best adapt to the shifting, the suction elements can in turn be extendable and shortenable (for instance, by means of a folding structure 16—FIGS. 1, 6 and 7).

In the embodiment shown, the shifting of the extracting device 6 and of the shaped mould 8 relative to one another from the stand-by position to the coupling position causes coupling between the shaped mould 8 and the retaining unit 14 placed in the projecting position (FIG. 6); only a further movement towards each other of the extracting device 6 and of the shaped mould 8 starting from the coupling position then causes the shifting of the first perimetric die 12 and of the second perimetric die 13 from the second position to the first position (FIG. 7). Finally, in the embodiment shown, to ensure proper clamping of the perimetric mould 7, the second perimetric die 13 is movable by being pushed by the shaped mould 8 until it comes to rest, by means of suitable sliding feet 17, on the closing element 9, which guarantees a greater counterthrust than the extracting device 6, which is normally cantilevered in the pick-up position.

Figure 4:
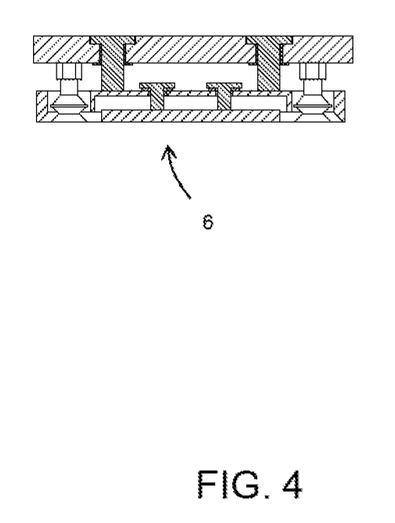

In use, once a flat sheet 4 of thermoformable material has been fed into the thermoforming device 3 and, in particular in the embodiments shown in the accompanying figures, into the closing element 9 (FIG. 1), the shaped mould 8 and the closing element 9 are brought to the forming position (FIG. 2) and the process for thermoforming the container 2 (FIG. 3) occurs in the known way by action of the vacuuming means. At the end of this process, the shaped mould 8 and the closing element 9 are brought to the home position (FIG. 4). At this point, the thermoformed container 2 has a flat upper flange 5.

The extracting device 6 is then activated and brought from the releasing position (or another intermediate position where it is located at the time) to the pick-up position, where, in the embodiment shown, it is interposed between the shaped mould 8 and the closing element 9. The shaped mould 8 and the extracting device 6 are now in the stand-by position relative to one another (FIG. 5).

The shaped mould 8 is then moved again to bring the shaped mould 8 itself and the extracting device 6 to the coupling position (FIG. 6). The suction system can be activated at this point, and the suction elements can begin to retain the thermoformed container 2 (this operation can, however, be postponed until after the hot bending of the flange 5 of the container 2).

Indeed, starting from the position shown in FIG. 6, the shaped mould 8 is moved again towards the extracting device 6, thus shifting the retaining unit 14 from the projecting position to the retracted position and bringing the first perimetric die 12 into contact with the second perimetric die 13 (FIG. 7). When the perimetric mould 7 closes, the perimetric flange 5 of the container 2 is clamped therein.

Figure 8:
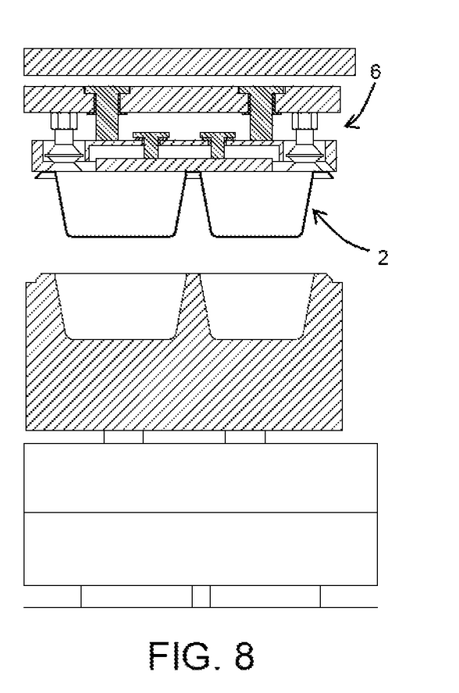
Figure 9:
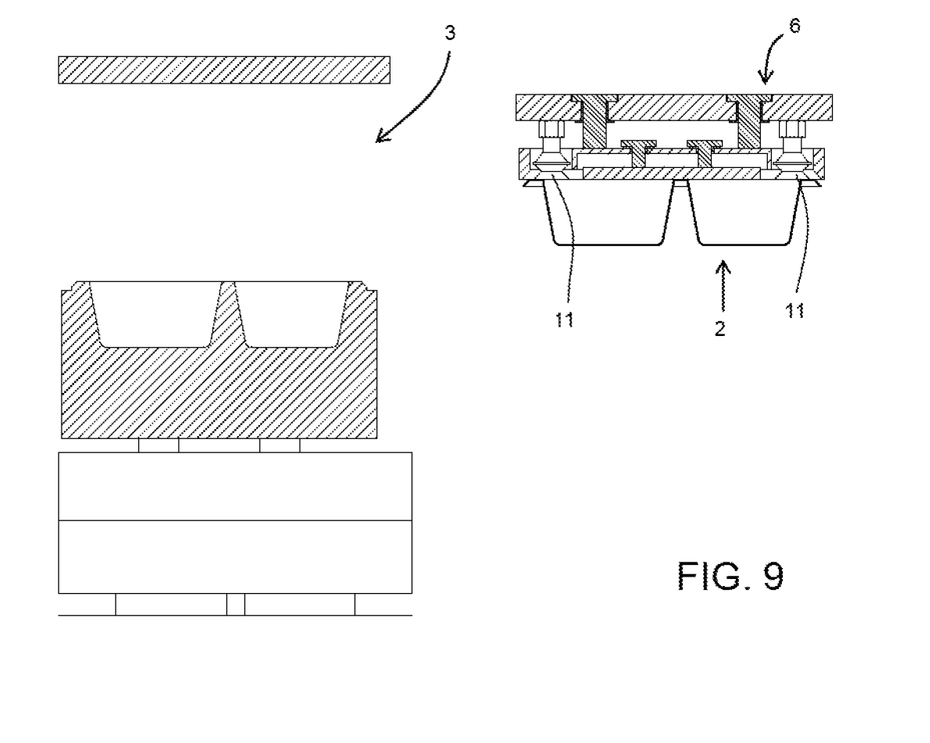

At the end of the hot bending step, the shaped mould 8 is returned to the stand-by position relative to the extracting device 6, and by the action of the suction elements the thermoformed container 2 is extracted from the shaped mould 8 and is kept retained by the extracting device 6; as can be seen in FIG. 8, the flange 5 is suitably shaped at this point (FIG. 8).

Figure 10:
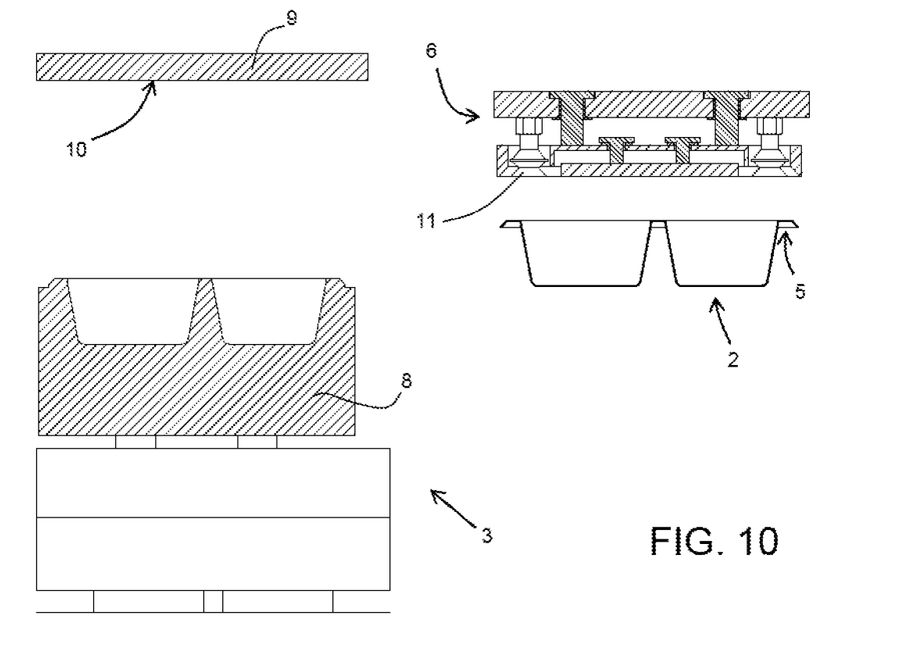
Figure 11:
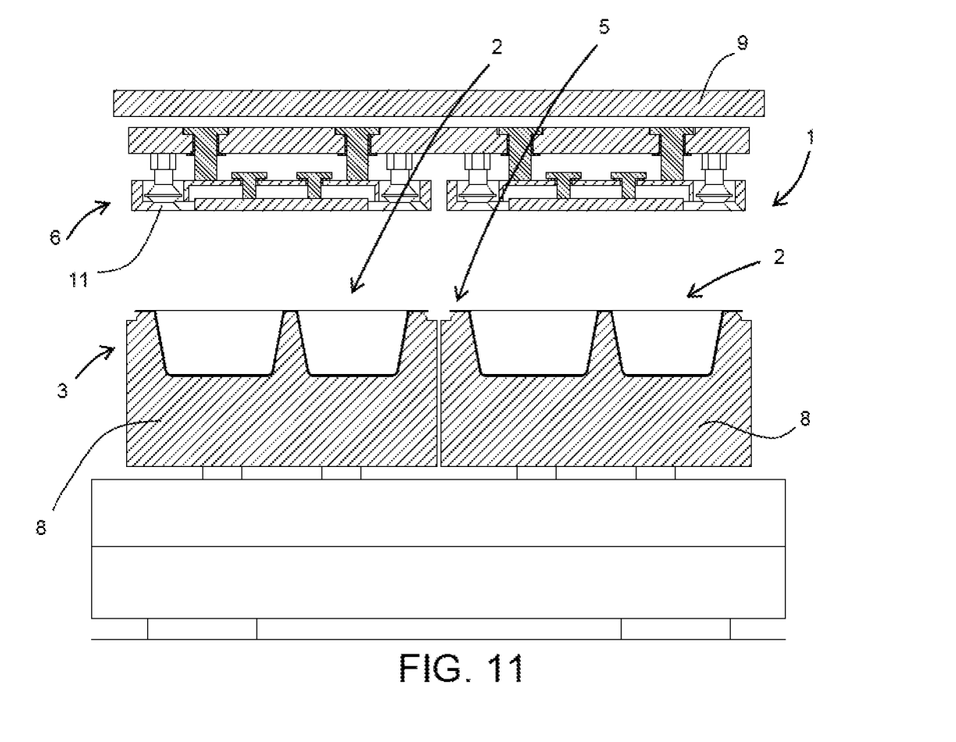
FIG. 11 shows a schematic cross-section front view of certain parts of a second embodiment of an apparatus in accordance with the present invention in an intermediate phase as shown in FIG. 5, in which a sheet of flat material has been thermoformed in a plastic container with a flat flange.

Subsequently, the extracting device 6 is moved to the releasing position (FIG. 9) where the suction system is disactivated so as to drop the container 2 onto a purpose fitted transferral device (not shown, as it does not form part of the apparatus 1—FIG. 10).

In relation to the above description relating to the present invention, it should be noted that both the method for extracting the thermoformed containers 2 from the shaped mould 8, for which suction elements (such as suction pads 11) are used which are suitable for keeping the container 2 for suction positioned exclusively at the upper flange 5 of the container 2, and a generic extracting device 6 equipped with such suction elements so positioned, must be considered to be an invention which is technically independent of the invention that is the object of the present patent application and, therefore, may themselves be the object of specific divisional patent applications or patent applications claiming the priority of the present patent application.

The present invention offers significant advantages.

First of all, the present invention has made it possible to make an apparatus for thermoforming plastic containers that has a shaped flange which is simpler in terms of construction than those known, as part of the perimetric mould for shaping the flange has been transferred from the thermoforming device to the extracting device.

As a result, format changing operations can be carried out quickly and easily, as can the operations necessary in any way for replacing the shaped mould and the extracting device, without having to always affect the closing element of the thermoforming device.

Furthermore, thanks to the technical solution developed, a decision can always be made as to whether or not to shape the flange simply by deciding the extent of the shifting of shaped mould and the extracting device relative to one another when extracting the container from the mould (indeed, it is sufficient to complete the shift when the shaped mould and the extracting device reach the coupling position so as not to activate the perimetric mould and keep the flange flat).

Finally, it is worth noting that the present invention is relatively easy to make and that the cost associated with its implementation is also not very high. Many modifications and variations can be made to the invention as designed herein without departing from the scope of the present invention.

All details can be replaced by other technically equivalent details and any materials, shapes and dimensions of the various components may be used according to requirements.

The invention claimed is:

1. An apparatus for thermoforming plastic containers (2) comprising:
   at least one thermoforming device (3) suitable for thermoforming a flat sheet (4) for making a container (2) equipped with an upper flange (5) projecting outward; and
   at least one extracting device (6) associable with the thermoforming device (3) for extracting the thermoformed container (2) from the thermoforming device (3);
   wherein when the extracting device (6) is associated with the thermoforming device (3) for extracting the thermoformed container (2), the extracting device (6) and the thermoforming device (3) define a perimetric mould (7) configured to hot bend the upper flange (5) of the container (2) before the container (2) is extracted from the thermoforming device (3).

2. The apparatus according to claim 1 wherein the thermoforming device (3) comprises a shaped mould (8) and a closing element (9) which are movable relative to each other between a home position in which the shaped mould (8) and the closing element (9) are at a distance from one another, and a forming position in which the shaped mould (8) and the closing element (9) are near each other for, in use, clamping between them the flat sheet (4), and one or more heating elements of the closing element (9) and/or of the shaped mould (8); wherein the extracting device (6) is associable with the shaped mould (8) and wherein the extracting device (6) forms the perimetric mould (7) with the shaped mould (8).

3. The apparatus according to claim 2 wherein the extracting device (6) is movable relative to the thermoforming device (3) between a pick-up position in which the extracting device (6) is facing the shaped mould (8), and a releasing position in which the extracting device (6) is not facing the shaped mould (8) and allows the shifting of the shaped mould (8) and of the closing element (9) between the home position and the forming position.

4. The apparatus according to claim 3 wherein, with the extracting device (6) in the pick-up position, at least one of either the extracting device (6) or the shaped mould (8) is movable relative to the other between a stand-by position in which the extracting device (6) and the shaped mould (8) are at a distance from each other and a coupling position in which the extracting device (6) and the shaped mould (8) are near each other for, in use, allowing the container (2) to be picked up by the extracting device (6); the shifting from the coupling position to the stand-by position, after the container (2) has been picked up by the extracting device (6), causing extraction of the container (2) from the shaped mould (8).

5. The apparatus according to claim 4 wherein the perimetric mould (7) is defined by the extracting device (6) and by the shaped mould (8) when the extracting device (6) and the shaped mould (8) are in the coupling position.

6. The apparatus according to claim 5 wherein the perimetric mould (7) for hot bending the upper flange (5) of the container (2) comprises a first perimetric die (12) defined by the shaped mould (8) and a second perimetric die (13) defined by the extracting device (6), the first perimetric die (12) and the second perimetric die (13) being shaped to match each other and facing each other when the extracting device (6) and the shaped mould (8) are in the coupling position.

7. The apparatus according to claim 6 wherein when the extracting device (6) and the shaped mould (8) are in the coupling position at least one of either the first perimetric die (12) or the second perimetric die (13) is movable relative to the other between a first position in which the first perimetric die (12) and the second perimetric die (13) are at a distance from each other and a second position in which the first perimetric die (12) and the second perimetric die (13) are near each other.

8. The apparatus according to claim 7 wherein:
   the extracting device (6) comprises a retaining unit (14) for retaining the container (2) which is equipped with one or more suction elements suitable for retaining the container (2) by suction;
   the retaining unit (14) is movable relative to the second perimetric die (13) between a projecting position and a retracted position;
   when the retaining unit (14) is in the projecting position the retaining unit (14) projects relative to the second perimetric die (13), towards the shaped mould (8), more than when the retaining unit (14) is in the retracted position;
   the shifting of the extracting device (6) and of the shaped mould (8) relative to one another from the stand-by position to the coupling position causes coupling between the shaped mould (8) and the retaining unit (14) placed in the projecting position; and
   a further movement towards each other of the extracting device (6) and of the shaped mould (8) starting from the coupling position causes the shifting of the first perimetric die (12) and of the second perimetric die (13) from the first to the second position.

9. The apparatus according to claim 8 wherein when the extracting device (6) is in the pick-up position the extracting device (6) is interposed between the shaped mould (8) and the closing element (9) which are placed in the home position and prevents the shifting of the shaped mould (8) and of the closing element (9) from the home position to the forming position.

10. The apparatus according to claim 8 wherein the closing element (9) has a resting surface (10) which is facing the shaped mould (8) at least when the closing element (9) and the shaped mould (8) are in the forming position, and is equipped with suction means suitable for retaining on the resting surface (10) the flat sheet (4) at least when the shaped mould (8) and the closing element (9) are in the home position.

11. The apparatus according to claim 7 wherein when the extracting device (6) is in the pick-up position the extracting device (6) is interposed between the shaped mould (8) and the closing element (9) which are placed in the home position and prevents the shifting of the shaped mould (8) and of the closing element (9) from the home position to the forming position.

12. The apparatus according to claim 7 wherein the closing element (9) has a resting surface (10) which is facing the shaped mould (8) at least when the closing element (9) and the shaped mould (8) are in the forming position, and is equipped with suction means suitable for retaining on the resting surface (10) the flat sheet (4) at least when the shaped mould (8) and the closing element (9) are in the home position.

13. The apparatus according to claim 6 wherein when the extracting device (6) is in the pick-up position the extracting device (6) is interposed between the shaped mould (8) and the closing element (9) which are placed in the home position and prevents the shifting of the shaped mould (8) and of the closing element (9) from the home position to the forming position.

14. The apparatus according to claim 6 wherein the closing element (9) has a resting surface (10) which is facing the shaped mould (8) at least when the closing element (9) and the shaped mould (8) are in the forming position, and is equipped with suction means suitable for retaining on the resting surface (10) the flat sheet (4) at least when the shaped mould (8) and the closing element (9) are in the home position.

15. The apparatus according to claim 4 wherein when the extracting device (6) is in the pick-up position the extracting device (6) is interposed between the shaped mould (8) and the closing element (9) which are placed in the home position and prevents the shifting of the shaped mould (8) and of the closing element (9) from the home position to the forming position.

16. The apparatus according to claim 4 wherein the closing element (9) has a resting surface (10) which is facing the shaped mould (8) at least when the closing element (9) and the shaped mould (8) are in the forming position, and is equipped with suction means suitable for retaining on the resting surface (10) the flat sheet (4) at least when the shaped mould (8) and the closing element (9) are in the home position.

17. The apparatus according to claim 3 wherein when the extracting device (6) is in the pick-up position the extracting device (6) is interposed between the shaped mould (8) and the closing element (9) which are placed in the home position and prevents the shifting of the shaped mould (8) and of the closing element (9) from the home position to the forming position.

18. The apparatus according to claim 17 wherein the closing element (9) has a resting surface (10) which is facing the shaped mould (8) at least when the closing element (9) and the shaped mould (8) are in the forming position, and is equipped with suction means suitable for retaining on the resting surface (10) the flat sheet (4) at least when the shaped mould (8) and the closing element (9) are in the home position.

19. The apparatus according to claim 3 wherein the closing element (9) has a resting surface (10) which is facing the shaped mould (8) at least when the closing element (9) and the shaped mould (8) are in the forming position, and is equipped with suction means suitable for retaining on the resting surface (10) the flat sheet (4) at least when the shaped mould (8) and the closing element (9) are in the home position.

20. The apparatus according to claim 2 wherein the closing element (9) has a resting surface (10) which is facing the shaped mould (8) at least when the closing element (9) and the shaped mould (8) are in the forming position, and is equipped with suction means suitable for retaining on the resting surface (10) the flat sheet (4) at least when the shaped mould (8) and the closing element (9) are in the home position.

21. The apparatus according to claim 1 wherein the thermoforming device (3) is configured to thermoform the flat sheet (4) for making the container (2) equipped with the upper flange (5).

22. An apparatus for thermoforming plastic containers (2) comprising:
at least one thermoforming device (3) suitable for thermoforming a flat sheet (4) for making a container (2) equipped with an upper flange (5) projecting outward; and
at least one extracting device (6) associable with the thermoforming device (3) for extracting the thermoformed container (2) from the thermoforming device (3);
wherein when the extracting device (6) is associated with the thermoforming device (3) for extracting the thermoformed container (2), the extracting device (6) and the thermoforming device (3) define a perimetric mould (7) suitable for hot bending the upper flange (5) of the container (2) before the container (2) is extracted from the thermoforming device (3);
wherein:
the thermoforming device (3) comprises a shaped mould (8) and a closing element (9) which are movable relative to each other between a home position in which the shaped mould (8) and the closing element (9) are at a distance from one another, and a forming position in which the shaped mould (8) and the closing element (9) are near each other for, in use, clamping between them the flat sheet (4), and one or more heating elements of the closing element (9) and/or of the shaped mould (8);
the extracting device (6) is associable with the shaped mould (8);
the extracting device (6) forms the perimetric mould (7) with the shaped mould (8);
the perimetric mould (7) comprises a first perimetric die (12) defined by the shaped mould (8) and a second perimetric die (13) defined by the extracting device (6), the first perimetric die (12) and the second perimetric die (13) being shaped to match each other and facing each other when the extracting device (6) and the shaped mould (8) are in a coupling position;
the extracting device (6) comprises a retaining unit (14) for retaining the container (2) which is equipped with one or more suction elements suitable for retaining the container (2) by suction; and
the retaining unit (14) is movable relative to the second perimetric die (13) between a projecting position and a retracted position; and
when the retaining unit (14) is in the projecting position, the retaining unit (14) projects relative to the second perimetric die (13), towards the shaped mould (8), more than when the retaining unit (14) is in the retracted position.

23. An apparatus for thermoforming plastic containers (2) comprising:
at least one thermoforming device (3) suitable for thermoforming a flat sheet (4) for making a container (2) equipped with an upper flange (5) projecting outward; and
at least one extracting device (6) associable with the thermoforming device (3) for extracting the thermoformed container (2) from the thermoforming device (3);
wherein when the extracting device (6) is associated with the thermoforming device (3) for extracting the thermoformed container (2), the extracting device (6) and the thermoforming device (3) define a perimetric mould (7) suitable for hot bending the upper flange (5) of the container (2) before the container (2) is extracted from the thermoforming device (3);

wherein:
  the thermoforming device (3) comprises a shaped mould (8) and a closing element (9) which are movable relative to each other between a home position in which the shaped mould (8) and the closing element (9) are at a distance from one another, and a forming position in which the shaped mould (8) and the closing element (9) are near each other for, in use, clamping between them the flat sheet (4), and one or more heating elements of the closing element (9) and/or of the shaped mould (8);
  the extracting device (6) is associable with the shaped mould (8);
  the extracting device (6) forms the perimetric mould (7) with the shaped mould (8);
  with the extracting device (6) in a pick-up position, at least one of either the extracting device (6) or the shaped mould (8) is movable relative to the other between a stand-by position in which the extracting device (6) and the shaped mould (8) are at a distance from each other and a coupling position in which the extracting device (6) and the shaped mould (8) are near each other for, in use, allowing the container (2) to be picked up by the extracting device (6); the shifting from the coupling position to the stand-by position, after the container (2) has been picked up by the extracting device (6), causing extraction of the container (2) from the shaped mould (8);
  the perimetric mould (7) comprises a first perimetric die (12) defined by the shaped mould (8) and a second perimetric die (13) defined by the extracting device (6), the first perimetric die (12) and the second perimetric die (13) being shaped to match each other and facing each other when the extracting device (6) and the shaped mould (8) are in the coupling position;
  the extracting device (6) comprises a retaining unit (14) for retaining the container (2);
  the shifting of the extracting device (6) and of the shaped mould (8) relative to one another from the stand-by position to the coupling position causes coupling between the shaped mould (8) and the retaining unit (14) placed in a projecting position; and
  a further movement towards each other of the extracting device (6) and of the shaped mould (8), starting from the coupling position, causes shifting of the first perimetric die (12) and of the second perimetric die (13) from a first to a second position.

24. An apparatus for thermoforming plastic containers (2) comprising:
  at least one thermoforming device (3) configured to thermoform a flat sheet (4) for making a container (2) equipped with an upper flange (5) projecting outward; and
  at least one extracting device (6) associable with the thermoforming device (3) for extracting the thermoformed container (2) from the thermoforming device (3);
wherein when the extracting device (6) is associated with the thermoforming device (3) for extracting the container (2) already thermoformed by the thermoforming device (3), the extracting device (6) and the thermoforming device (3) define a perimetric mould (7) configured to shape the upper flange (5) of the container (2) already thermoformed by the thermoforming device (3) before the thermoformed container (2) is extracted from the thermoforming device (3).

* * * * *